(12) United States Patent
Feinberg et al.

(10) Patent No.: US 7,856,369 B2
(45) Date of Patent: Dec. 21, 2010

(54) FREQUENCY BASED METHOD FOR SCHEDULING JOBS WITH HARD CONSTRAINTS

(75) Inventors: Eugene Feinberg, Setauket, NY (US); Michael Curry, East Northport, NY (US)

(73) Assignee: Research Foundation of the State University of New York, Stony Brook, NY (US)

( * ) Notice: Subject to any disclaimer, the term of this patent is extended or adjusted under 35 U.S.C. 154(b) by 1501 days.

(21) Appl. No.: 10/613,507

(22) Filed: Jul. 3, 2003

(65) Prior Publication Data

US 2004/0059620 A1 Mar. 25, 2004

(51) Int. Cl.
*G06F 17/50* (2006.01)

(52) U.S. Cl. .................. 705/7; 370/231; 370/232; 370/233; 370/395.4

(58) Field of Classification Search .............. None
See application file for complete search history.

(56) References Cited

U.S. PATENT DOCUMENTS

| | | | |
|---|---|---|---|
| 6,578,005 B1 * | 6/2003 | Lesaint et al. ............. | 705/8 |
| 6,704,692 B1 * | 3/2004 | Banerjee et al. ............ | 702/189 |
| 7,043,731 B2 * | 5/2006 | Ramaswamy ............. | 718/105 |

OTHER PUBLICATIONS

Amotz Bar-Noy et al., "Nearly Optimal Perfectly-Periodic Schedules," (Nov. 1, 2000).*

Michael B. Jones et al., "CPU Reservations and Time Constraints," ACM (1997).*

Chih-wen Hsueh et al., "Distributed Pinwheel Scheduling with End-to-End Timing Constraints," IEEE (1995).*

Mee Yee Chan & Francis YL Chin, "General Schedulers for the Pinwheel Problem Based on Double-Integer Reduction," IEEE Transactions on Computers, vol. 41, No. 6, p. 755 (Jun. 1992).*

Chih-wen Hsueh & Kwei-Jay Lin, "Scheduuloing Real-Time Systems with End-to-End Timing Constraints Using the Distributed Pinwheel Model," IEEE Transactions on Computers, vol. 50, No. 1, p. 51 (Jan. 2001).*

Amotz Bar-Noy et al., "Minimizing Service and Operation Costs of Periodic Scheduling," Proceedings of the ninth annual ACM-SIAM symposium on Discrete algorithms, p. 11 (1998).*

C.L. Liu & James W. Leyland, "Scheduling Algorithms for Multi-programming in a Hard-Real-Time Environment," ACM (1973).*

Sanjoy Baruah & Azer Bestavros, "Pinwheel Scheduling for Fault-tolerant Broadcast Disks in Real-time Database Systems," IEEE (1997).*

Eugene A. Feinberg, List of Published Papers (retrieved Jan. 2008).*

* cited by examiner

*Primary Examiner*—R. D Rines
(74) *Attorney, Agent, or Firm*—F. Chau & Associates, LLC

(57) ABSTRACT

A method is provided for generating a feasible schedule for n jobs given a duration and a revisit time for each job. The method comprises determining whether it is impossible to generate a feasible schedule, determining whether a round robin schedule is possible, calculating theoretical probabilities, calculating actual probabilities, creating a potential schedule based on the theoretical probabilities and the actual probabilities, and searching for a feasible schedule from the potential schedule.

6 Claims, 2 Drawing Sheets

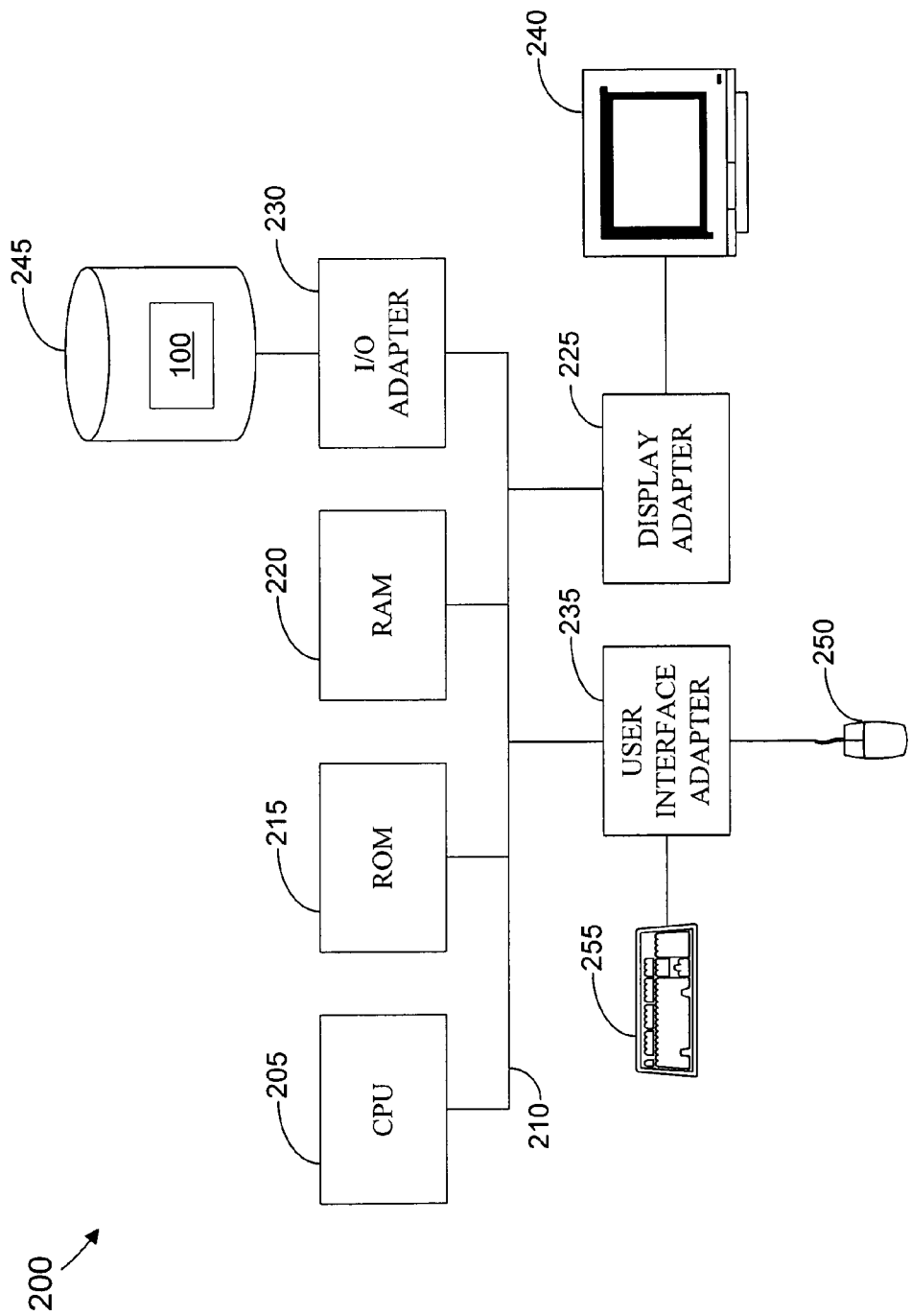

FREQUENCY BASED METHOD FOR SCHEDULING JOBS WITH HARD CONSTRAINTS

BACKGROUND OF THE INVENTION

1. Field of the Invention

The present invention relates to a frequency based method and system, and, more particularly, to a frequency based method and system for scheduling jobs with hard constraints.

2. Description of the Related Art

Suppose there are n jobs to be completed. Each job i (where i=1 to n) is characterized by two parameters: $\tau_i$, the duration of job i (hereinafter referred to as "duration time") and $\mu_i$, the maximum amount of time that can transpire between consecutive performances of job i (hereinafter referred to as "revisit time"). The n jobs are to be completed by a single processor. There is no preemption. Preemption is a scheduling technique in which a server alternates between a plurality of different pending job requests, servicing portions of each job request until eventually all of the job requests are complete. Further, setups are instantaneous. In other words, each job begins instantaneously without any setup time. A schedule is feasible if every job i can be performed again no more than $\mu_i$ seconds after it was last performed. The revisit time $\mu_i$ is a hard constraint (i.e., it cannot be violated). An issue arises whether an infinite horizon feasible schedule exists for a given instance of this problem (hereinafter referred to as a "feasible scheduling problem").

One example of the feasible scheduling problem is the pinwheel problem. If all $\tau_i$ (i.e., $\tau_1$ to $\tau_N$) are equal to 1, then the feasible scheduling problem becomes a "pinwheel problem." The pinwheel problem is concerned with communication between n transmitters and a common receiver. The receiver can only receive one signal at a time and the transmitters do not receive feedback about whether a transmission has been received. To guarantee that a signal is received, each transmitter repeatedly transmits a signal. The duration of time that it takes the receiver to process a signal is the same for all signals. It can be shown that no instance of the pinwheel problem can be scheduled if:

$$\rho = \sum_{i=1}^{n} \frac{1}{1+\mu_i} > 1.$$

Holte, Rosier, Tulchinsky, and Varvel show that any instance with $\rho<0.5$ can be scheduled in polynomial time. See R. Holte, L. Rosier, I. Tulchinsky, and D. Varvel, "Pinwheel Scheduling with Two Distinct Numbers," *Theoretical Computer Science* (1992) 100 pp. 105-135; R. Holte, L. Rosier, I. Tulchinsky, and D. Varvel, "The Pinwheel: A Realtime Scheduling Problem," *Proceedings of the Twenty-Second Annual Hawaii International Conference on System Sciences* (1989) pp. 693-702. Chan and Chin improve this result by showing that polynomial time can be achieved with $$\rho < \frac{2}{3}$$

and $\rho<0.7$ in two consecutive papers. See M. Y. Chan and F. Chin, "General Schedulers for the Pinwheel Problem Based on Double Integer Reduction," *IEEE Transactions on Computers* (1992) 41 pp. 755-768; M. Y. Chan and F. Chin, "Schedulers for Larger Classes of Pinwheel Instances," *Algorithmica* (1993) 9 pp. 425-462. Chan and Chin use a technique known as integer reduction, where an instance that is not known to have a feasible schedule is reduced to one that is known to have a feasible schedule. For only three distinct numbers, Lin and Lin prove a similar result for $\rho<0.83$. See S. S. Lin and K. J. Lin, "A Pinwheel Scheduler for Three Distinct Numbers with a Tight Schedulability Bound," *Algorithmica* (1997) 19 pp. 411-426.

Although the pinwheel problem is a common example of the feasible scheduling problem, an ideal solution should solve any type of feasible scheduling problem. In other words, the ideal solution would find a feasible schedule of visits for n jobs for all $\tau_i$, and $\mu_i$ in which a feasible schedule is possible. Although several solutions exist, the solutions are not ideal because, for example, they are computationally impractical or they fail to find a feasible schedule of visits in many instances when a feasible schedule is possible.

One solution is the Dynamic Programming ("DP") approach. The DP approach is an iterative approach. If all $\tau_i$ and $\mu_i$ are rational numbers, the DP approach will converge after a finite number of steps. Here it is assumed, without loss of generality, that all $\tau_i$ and $\mu_i$ are integers. The DP approach makes use of residual vectors to first test for feasibility, then to recreate the feasibility schedule if one exists for given values of $\tau_i$ and $\mu_i$. The DP algorithm is provided below in pseudo-code.

1. Define a vector valued function W and let $V_0=0$ and W=0 for all $\vec{x} \in X$. Let n=0.

2. For all $\vec{x} \in X$:

$$V_{n+1}(\vec{x}^N) = \begin{cases} -1, & \text{if } V_n(\vec{x}^C) = -1 \text{ or } \vec{x}^N = g \text{ or } \vec{x}^C = g; \\ -0, & \text{otherwise.} \end{cases}$$

3. If $V(\vec{x})=W(\vec{x})$ for all $\vec{x} \in X$ go to step 4. Otherwise, set $W(\vec{x})=V(\vec{x})$ and go to step 2.

4. If $V(\vec{x})=-1$ for all $\vec{x} \in X$, then the problem does not have a feasible schedule. Otherwise, the feasible schedule is among the $V(\vec{x})=0$. To find this schedule, one needs only to trace the schedule through until all the stations have been visited at least once and a particular station is revisited.

Determining a feasible schedule iteratively using the DP approach may require an exponential amount of time. The DP approach considers all the possible residual values that can be generated. As the number of jobs i increases, the number of residual vectors increases exponentially. Such a drain on resources is a flaw with DP. More particularly, the DP approach suffers from Bellman's "curse of dimensionality" (i.e., by increasing the dimensionality of a problem, the amount of resources that one needs to solve the problem increases exponentially). Thus, the DP approach would exhaust the resources of any computer while trying to compute a schedule for a relatively small number of jobs i. Accordingly, computing a schedule using the DP approach for a large number of jobs i would be impractical, if not impossible.

Because an exact algorithm is not practical for an NP-hard problem, heuristic approaches have been developed. Two well known examples of heuristic scheduling are the Due Date approach and the Critical Ratio approach. The Due Date approach naively selects the location with the smallest residual time from the residual vector. The problem with this approach is that the location with the smallest residual time may have the most danger of not being visited before $\mu_i$ transpires. Furthermore, the Due Date approach does not make use of the information contained in $\tau_i$ or $\mu_i$. For an approach to be successful, it must make use of all of the information available at the time the decision is to be made. The Due Date approach is not ideal because it fails to find a feasible schedule of visits in many instances when a feasible schedule is possible. The Due Date algorithm is provided below in pseudocode.

1. Initially, the variable that keeps track of the iterations, j, is set to 0. Set $r_i^0 = u_i$, i=1, ..., n.
2. Select the job with the smallest residual time. Let $k = \min_i r_i$, i=1, ..., n.
3. Increase the iteration variable j by 1, j=j+1;

$$r_i^j = \begin{cases} u_k, & \text{if } i = k; \\ r_i - \tau_i, & \text{otherwise.} \end{cases}$$

4. Check to see if $r_i^j \geq 0$, i=1, ..., n. If yes, then go to Step 2. If no, then the Due Date algorithm does not produce a feasible schedule of visits.

Consider the following example: $\tau_1=1$, $\tau_2=2$, $\tau_3=3$, and $\mu_1=4$, $\mu_2=5$, $\mu_3=4$. By choosing the job with the smallest residual time and breaking ties by considering the duration time $\tau_i$, the following sequence of jobs is obtained: 1, 3, 1, 2, 3. The sequence of jobs is obtained as follows. The initial residual vector is (4, 5, 4). Because there is a tie in residual times between jobs 1 and 3, job 1 is chosen because it has a shorter duration of 1, whereas job 3 has a duration of 3. The residual vector becomes (4, 4, 3) after choosing job 1 (i.e., 4, 5−1, 4−1). It becomes (1, 1, 4) after visiting location 3, (4, 0, 3) after visiting location 1, (2, 5, 1) after visiting location 2, and (−1, 2, 4) after visiting location 3 again. A negative value indicates that a job was not performed within the revisit time $\mu_i$. As mentioned previously, the revisit time $\mu_i$ is a hard constraint. Although the Due Date approach failed to find a feasible schedule of visits, a feasible schedule for this example does exist: 1, 2, 1, 3, 1, 2, etc. . . . (repeating).

Unlike the Due Date approach, the Critical Ratio approach makes use of all of the information available to decide which location to visit next. However, it also is not ideal because it fails to find a feasible schedule of visits in many instances when a feasible schedule is possible. With each transition of the Critical Ratio approach, an auxiliary vector is formed. The auxiliary vector consists of the following ratios:

$$k = \min_i \frac{r_i + \tau_i}{\mu_i + \tau_i}, i = 1, ..., n.$$

where i=1, ..., N. Under the Critical Ratio approach, the job that is going to expire the soonest (i.e., the job with the smallest ratio in the auxiliary vector) is selected. While the Critical Ratio heuristic addresses some of the problems associated with the Due Date approach, it is not a complete solution. The Critical Ratio algorithm is provided below in pseudo-code.

1. Initially, the variable that keeps track of the iterations, j, is set to 0. Set $r_i^0 = u_i$, i=1, ..., n.
2. Select the job with the smallest value of $$\frac{r_i + \tau_i}{\mu_i + \tau_i}.$$

Let $$\frac{r_i + \tau_i}{\mu_i + \tau_i},$$

3. Increase the iteration variable j by 1, j=j+1;

$$r_i^j = \begin{cases} u_k, & \text{if } i = k; \\ r_i - \tau_i, & \text{otherwise.} \end{cases}$$

4. Check to see if $r_i^j \geq 0$, i=1, ..., n. If yes, then go to Step 2. If no, then the Critical Ratio algorithm does not produce a feasible schedule of visits.

Consider the same example used for the Due Date approach above: $\tau_1=1$, $\tau_2=2$, $\tau_3=3$, and $\mu_1=4$, $\mu_2=5$, $\mu_3=4$. By choosing the job with the smallest ratio in the auxiliary vector and arbitrarily breaking ties, two infeasible sequences may be generated: 1, 2, 3 and 1, 3, 1, 2, 3. It is assumed that the initial residual vector contains all zeros. The sequences of visits are obtained as follows. The initial residual vector is (0, 0, 0). The initial auxiliary vector is (1/5, 2/7, 3/7) The smallest ratio in the initial auxiliary vector is for job 1. The residual vector becomes (4, 4, 3) after choosing job 1 (i.e., 4, 5−1, 4−1). The auxiliary vector becomes (5/5, 6/7, 6/7).

Now there is a tie between the ratios of jobs 2 and 3. If job 2 is chosen, the residual vector becomes (2, 5, 1) and the auxiliary vector becomes (3/5, 7/7, 4/7). Job 3 is then chosen and the residual vector becomes (−1, 2, 4). The algorithm terminates because of the negative value in the residual vector. If job 3 is chosen, the residual vector becomes (1, 1, 4) and the auxiliary vector becomes (3/5, 7/7, 4/7). When job 1 is chosen next, the residual vector becomes (4, 0, 3) and the auxiliary vector becomes (5/5, 2/7, 6/7). When job 2 is chosen next, the residual vector becomes (2, 5, 1) and the auxiliary vector becomes (3/5, 7/7, 4/7). Job 3 is then chosen and the residual vector becomes (−1, 2, 4). The algorithm terminates because of the negative value in the residual vector. Accordingly, the Critical Ratio approach fails to find the feasible schedule of visits of 1, 2, 1, 3, 1, 2, etc. . . . (repeating), as shown earlier.

The DP algorithm is proven to be unworkable because it requires exponential resources. The Due Date and Critical Ratio approaches fail to find a feasible schedule of visits in many instances, such as the examples shown earlier. Therefore, a need exists for an approach that finds a feasible schedule of visits for most, if not all, instances with n jobs given a duration, $\tau_i$, and a revisit time, $\mu_i$. The algorithm should make use of all of the information available at the time the decision is to be made.

The present invention is directed to overcoming, or at least reducing the effects of, one or more of the problems set forth above.

SUMMARY OF THE INVENTION

In one aspect of the present invention, a method for generating a feasible schedule for n jobs given a duration and a revisit time for each job is provided. The method comprises determining whether it is impossible to generate a feasible schedule, determining whether a round robin schedule is possible, calculating theoretical probabilities, calculating actual probabilities, creating a potential schedule based on the theoretical probabilities and the actual probabilities, and searching for a feasible schedule from the potential schedule.

In another aspect of the present invention, a machine-readable medium having instructions stored thereon for execution by a processor to perform a method of generating a feasible schedule is provided. The medium contains instructions for determining whether it is impossible to generate a feasible schedule, determining whether a round robin schedule is possible, calculating theoretical probabilities, calculating actual probabilities, creating a potential schedule based on the theoretical probabilities and the actual probabilities, and searching for a feasible schedule from the potential schedule.

In yet another aspect of the present invention, a system of generating a feasible schedule is provided. The system comprises means for calculating theoretical probabilities, means for calculating actual probabilities, means for creating a potential schedule based on the theoretical probabilities and the actual probabilities, and means for searching for a feasible schedule from the potential schedule.

These and other aspects, features and advantages of the present invention will become apparent from the following detailed description of exemplary embodiments, which is to be read in connection with the accompanying drawings.

BRIEF DESCRIPTION OF THE DRAWINGS

The invention may be understood by reference to the following description taken in conjunction with the accompanying drawings, in which like reference numerals identify like elements, and in which:

FIG. 2 depicts a block diagram of a processor-based system 200 for executing the flowchart representation of FIG. 1, in accordance with one embodiment of the present invention.

DETAILED DESCRIPTION OF PREFERRED EMBODIMENTS

Figure 1:
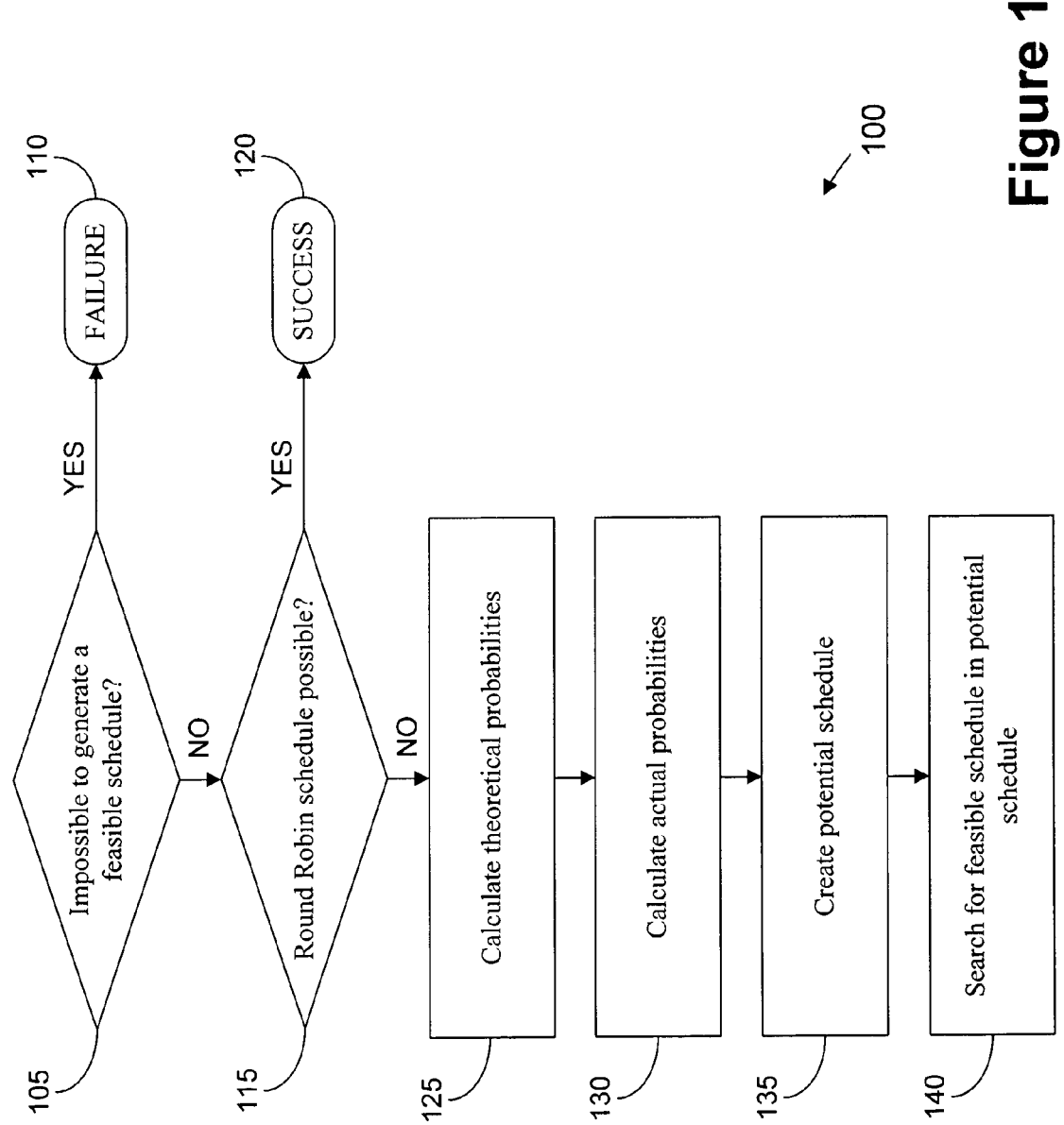
FIG. 1 depicts a flowchart representation of one embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

It is to be understood that the systems and methods described herein may be implemented in various forms of hardware, software, firmware, special purpose processors, or a combination thereof. In particular, the present invention is preferable implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces (shown in greater detail in FIG. 2). It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

The present invention involves a principally new algorithm for finding a feasible schedule for n jobs given a duration, $\tau_i$, and a revisit time $\mu_i$. The algorithm (as illustrated in greater detail below) will hereinafter be referred to as a "Frequency Based" Algorithm. The Frequency Based Algorithm uses results from the theory of Semi-Markov Decision Processes ("SMDP"). The SMDP is based on the following observation: if the feasible scheduling problem is modified such that an average of the given residual constraints are satisfied, then the problem becomes a polynomial problem.

An illustrative embodiment of the Frequency Based Algorithm is provided below in pseudo-code.

1. Let n be the number of jobs. Define $\tau_i$ and $\mu_i$, i=1, ..., n, to be the duration times and revisit times, respectively. Define num to be the total number of iterations to be simulated. The value of num is arbitrarily chosen to be large enough that the trend of the sequence of visits will be established in the long run.

2. If $$\sum_{i=1}^{n} \frac{\tau_i}{\tau_i + \mu_i} > 1,$$

then the problem is infeasible and the algorithm ends.

3. If for each i=1, ..., n, the inequality $$\sum_{i \neq i} \tau_i \leq u_i,$$

the "Round Robin" sequence 1, 2, 3, ..., n, repeated an infinite number of times, forms a feasible sequence, then the algorithm ends.

4. Select $$z_i \geq \frac{\tau_i}{\tau_i + k \cdot u_i}, i = 1, \ldots, n,$$

such that $$\sum_{i=1}^{n} \frac{\tau_i}{\tau_i + \mu_i} = 1.$$

This step can be implemented in a number of ways. Examples include $$z_i = \frac{\tau_i(\tau_i + u_i)^{-1}}{\sum_{j=1}^{n} \frac{\tau_j}{\tau_j + u_i}} \text{ or } z_i = \frac{1}{\tau_i + k \cdot u_i}$$

with k independent of i=1, ..., n.

5. Let $$q_i = \frac{z_i}{\sum_{j=1}^{n} z_j}, i = 1, \ldots, n.$$

The value of $q_i$ is the probability that job i will be performed next.

6. a) Initialize $N_1, \ldots, N_n$ and N to zero. The variable $N_i$ counts the number of visits to job i. The variable N counts the number of jobs overall.
   (b) Define a one-dimensional array called seq. The array seq will store the sequence of jobs performed. The size of the array seq is the maximum length of the generated sequence num. In other words, num is an upper limit for N.
   (c) Define a two-dimensional array called v. This array will store the difference between the theoretical proportion of time that must be spent performing each job and the actual proportion of time spent performing each job. The dimensions of v are n by num (i.e., the number of jobs by the number of jobs performed).
   (d) Define a two-dimensional array called r. The array r will be used to store the residual values at each iteration. The array r will have dimensions n by num (i.e., the number of jobs by the number of jobs performed).
7. a) Initialize $v_i = q_i$, $i=1, \ldots, n$.
   b) Initialize $d_i = v_i$, $i=1, \ldots, n$.
8. For (N=1 to num)
   Let $j = \mathrm{argmax}_{i=1,\ldots,n} d_i$. If there is a tie, arbitrarily select j as the next job to be performed. Set:

$$N_j = N_j + 1;$$

$$N = N + 1;$$

$$d_i = v_i - \frac{N_i}{N}, i = 1, \ldots, n.$$

$$seq_N = j.$$

(The array seq now stores the sequence of visits according to the probabilities prescribed by $q_i$, $i=1, \ldots, n$. The remainder of the algorithm searches the array seq for a feasible fragment.)

9. Initialize variables a and b. Let a=l and b=a, where l is a "large" integer which is a small fraction of num. The variable a is the beginning of the fragment being tested for feasibility and b is the end of the fragment.
10. Set $r_i^a = u_i$, $i=1, \ldots, n$.
11. Increase b=b+1 and calculate $$r_i^b = \begin{cases} u_i, & \text{if } i = seq_b; \\ r_i - \tau_i, & \text{otherwise.} \end{cases} i = 1, \ldots, n.$$

12. If $r_i^b < 0$ at least for one $i=1, \ldots, n$, go to step 16.
13. If $seq_a \neq seq_b$, then go to step 11.
14. If there is at least one job that has not been visited at least once between iteration a and b inclusive, then go to step 11.
15. Repeat the fragment $f = seq_a, seq_{a+1}, \ldots, seq_{b-1}, seq_b$ and check if the resulted fragment f, f is feasible. If yes, then f, f, f, ... (repeating) is a feasible schedule.
16. Increase a=a+1 and set b=a.
17. If $a \geq num - n$, then the algorithm stops without finding a feasible schedule. Otherwise, go to step 10.

Referring now to FIG. 1, a method 100 of generating a feasible schedule given n jobs with a duration, $\tau_i$, and a revisit time, $\mu_i$, where $i=1, \ldots, n$ is shown. The method 100 determines (at 105) whether it is impossible to generate a feasible schedule for the n jobs. This may be determined using the following formula as illustrated earlier in step 2 of the Frequency Based Algorithm:

$$\sum_{i=1}^{n} \frac{\tau_i}{\tau_i + \mu_i} > 1.$$

If the sum of the durations, $\tau_i$, for all jobs i is greater than the sum of the durations, $\tau_i$, plus the sum of the revisit times, $\mu_i$, for all jobs i, then a feasible schedule is mathematically impossible. If generating a feasible schedule is impossible, the method 100 terminates (at 110). On the other hand, if the sum of the durations, $\tau_i$, plus the sum of the revisit times, $\mu_i$, for all jobs i, then a feasible schedule is potentially possible.

If generating a feasible schedule is potentially possible, the method 100 determines (at 115) whether a "round robin" schedule is possible. The "round robin" schedule is illustrated in step 3 of the Frequency Based Algorithm. A round robin schedule performs the n jobs in sequential order (i.e., 1, 2, 3, ..., n) over an infinite number of repetitions. For example, a sequence of three jobs 1, 2, and 3 would form a round robin schedule of 1, 2, 3, 1, 2, 3, etc. ... (repeating). If a round robin schedule is feasible for the n jobs, then a feasible schedule has been successfully generated and the method 100 terminates (at 120).

If the round robin schedule is not possible, then theoretical probabilities for each job i are calculated (at 125). The process for creating the theoretical probabilities are illustrated in steps 4 and 5 of the Frequency Based Algorithm. The theoretical probability for each job i is represented by the array, $q_i$. The theoretical probability, $q_i$, is generated in steps 4 and 5 of the Frequency Based Algorithm from a set of known equations based on the theory of SMDP. The known equations are explained in greater detail in K. W. Ross, "Randomized and Past-Dependent Policies for Markov Decision Processes with Multiple Constraints," *Operations Research* 37 (1989) pp. 474-477 and E. Altman and A. Shwartz, "Time-sharing Policies for Controlled Markov Chains," *Operations Research* 41 (1993) pp. 1116-1124. It is understood that other equations known to one skilled in the art may be used for generating the theoretical probability $q_i$.

The method 100 calculates (at 130) actual probabilities for each job i. The process for creating the actual probabilities are illustrated in steps 6 and 7 of the Frequency Based Algorithm. The actual probability is the relative amount of time that each job i is to be performed. The actual probability for each job i is represented by a value $$\frac{N_i}{N},$$

where $n_i$ is the number of visits to job i and N is the number of visits total for all jobs 1 to n.

The method 100 creates (at 135) a potential schedule of jobs that may or may not be feasible. The process for creating the potential schedule is illustrated in step 8 of the Frequency Based Algorithm. The potential schedule, seq, is created by choosing the job i that is farthest from the theoretical probability, $q_i$. A function, argmax, returns the job number for the job i that is farthest from the theoretical probability, $q_i$. The job number is stored in the potential schedule, seq. Step 8 of the Frequency Based Algorithm is repeated for num times.

The method 100 searches (at 140) the potential schedule for a feasible schedule. The search for the feasible schedule is illustrated in steps 9 through 17 of the Frequency Based Algorithm. Variables that are necessary for searching the potential schedule for a feasible schedule are initialized in step 9 of the Frequency Based Algorithm. A variable a, which is the beginning of a feasible fragment, is initialized to 1. The variable l must be a number "large" enough for a trend to be established. The term "trend" refers to a mathematical principal whereby a sample of jobs from the beginning of the sequence is less reliable than a sample of jobs from an arbitrary location in the middle of the sequence. A variable b, which is the end of the feasible fragment, is initialized to a.

In step 10 of the Frequency Based Algorithm, the residual vector r is initialized to the value $u_i$ for all i=1, ..., n. In step 11, the end of the sequence, b, is incremented by 1. The job b is performed and the residual value is updated and stored in the residual vector r. In step 12, it is determined whether a residual vector r contains a negative value. If yes, the Frequency Based Algorithm goes to step 16. If no, the Frequency Based Algorithm goes to step 13. In step 13, it is determined whether the feasible fragment repeats. If no, the Frequency Based Algorithm goes to step 11. If yes, the Frequency Based Algorithm goes to step 14. In step 14, it is determined whether each job i has been visited at least once in a feasible fragment. If no, the Frequency Based Algorithm goes to step 11. If yes, the Frequency Based Algorithm goes to step 15. In step 15, it is determined if the feasible fragment can be infinitely repeated. If yes, a feasible schedule has been successfully generated and the Frequency Based Algorithm terminates. If not, the Frequency Based Algorithm goes to step 16. In step 16, the variable a is incremented by one and the variable b is set equal to a. In step 17, it is determined whether the number of jobs i to be simulated is greater than the number of jobs available in the potential schedule, seq. If no, then the Frequency Based Algorithm goes to step 10. If yes, then the Frequency Based Algorithm has failed to find a feasible schedule and terminates.

In addition to the binary search method illustrated above, it should be appreciated that a variety of binary search methods have been devised to this date. These binary search methods are well known in the art. Although a binary search method is used in the embodiments of the present invention, other search methods are equally suitable for implementation in the present invention For example, in an alternate embodiment, a hash table may be used.

Consider the same example used for the Due Date and Critical Ratio approaches above: $\tau_1=1, \tau_2=2, \tau_3=3$, and $\mu_1=4, \mu_2=5, \mu_3=4$. The results from applying the Frequency Based Algorithm are as follows:

|   | $X_1$ | $X_2$ | $X_3$ |   |
|---|---|---|---|---|
| 3 | 4 | 5 | 4 |
| 1 | 1 | 2 | 4 |
| 2 | 4 | 1 | 3 |
| 1 | 2 | 5 | 1 |
| 3 | 4 | 4 | 0 |
| 1 | 1 | 1 | 4 |
| 2 | 4 | 0 | 3 |
| 1 | 2 | 5 | 1 |

The feasible schedule of 1, 2, 1, 3, etc. ... (repeating) has been successfully generated using the Frequency Based Algorithm.

Referring now to FIG. 2, a block diagram of a processor-based system 200 is for executing the frequency based method 100 illustrated in FIG. 1 is shown, in accordance with one embodiment of the present invention. The processor-based system 200 includes at least one processor (CPU) 205 operatively coupled to other components via a system bus 210. A read only memory (ROM) 215, a random access memory (RAM) 220, a display adapter 225, an I/O adapter 230, and a user interface adapter 235 are operatively coupled to the system bus 210. The display device 240 is operatively coupled to the system bus 210 via the display adapter 225. A disk storage device (e.g., a magnetic or optical disk storage device) 245 is operatively coupled to the system bus 210 by the I/O adapter 230. The frequency based method 100 illustrated in FIG. 1 is stored in the disk storage device 230. A mouse 250 and keyboard 255 are operatively coupled to the system bus 210 via the user interface adapter 235. The mouse 250 and keyboard 255 may be used to input/output information to/from the processor based system 200.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A non-transitory computer readable medium embodying instructions executable by a processor to perform a method of generating a feasible schedule for n jobs given a duration and a revisit time for each job, comprising:
   receiving input data describing the n jobs, the duration, and the revisit time for each of the n jobs; determining from the input data that a round robin schedule is not possible and performing steps for determining a feasible schedule, wherein determining the feasible schedule comprises,
      calculating a theoretical probability for each of the n jobs, wherein the theoretical probability is a probability that a job will be performed next;
      calculating an actual probability for each of the n jobs wherein the actual probability is a relative amount of time that each job is performed;
      creating a potential schedule for the n jobs based on the theoretical probabilities and the actual probabilities;
      searching for the feasible schedule of the n jobs from the potential schedule of the n jobs; and outputting the feasible schedule wherein the n jobs are scheduled according to the feasible schedule.

2. The computer readable medium of claim 1, further comprising determining whether it is impossible to generate a feasible schedule by determining whether $$\sum_{i=1}^{n} \frac{\tau_i}{\tau_i + \mu_i} > 1$$

is satisfied, wherein
   n is a number of jobs,
   $\tau_i$ is a duration time, and
   $\mu_i$ is a revisit time.

3. The computer readable medium of claim 1, wherein calculating theoretical probabilities comprises selecting a theoretical probability $$z_i \geq \frac{\tau_i}{\tau_i + k \cdot u_i}, i = 1, \ldots, n,$$

such that $$\sum_{i=1}^{n} \frac{\tau_i}{\tau_i + \mu_i} = 1,$$

wherein
$\tau_i$ is a duration time,
$u_i$ is a value of a residual vector,
n is a number of jobs, and
$\mu_i$ is a revisit time.

4. The computer readable medium of claim 3, wherein calculating theoretical probabilities further comprises calculating an array including the theoretical probability for the n jobs.

5. The computer readable medium of claim 1, wherein creating a potential schedule based on the theoretical probabilities and the actual probabilities comprises determining a difference between the theoretical probabilities and the actual probabilities for each of the n jobs.

6. The computer readable medium of claim 5, wherein searching for the feasible schedule of the n jobs from the potential schedule of the n jobs further includes determining a job number for each of the n jobs.

* * * * *